US009436669B1

(12) United States Patent
Sorensen (10) Patent No.: US 9,436,669 B1
(45) Date of Patent: Sep. 6, 2016

(54) SYSTEMS AND METHODS FOR INTERFACING WITH DYNAMIC WEB FORMS

(75) Inventor: Jens Sorensen, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 641 days.

(21) Appl. No.: 13/226,257

(22) Filed: Sep. 6, 2011

(51) Int. Cl.
*G06F 3/048* (2013.01)
*G06F 17/24* (2006.01)
*G06F 3/0484* (2013.01)

(52) U.S. Cl.
CPC ......... *G06F 17/243* (2013.01); *G06F 3/04842* (2013.01)

(58) Field of Classification Search
CPC .......................... G06F 17/243; G06F 3/04842
USPC ....................................................... 715/226
See application file for complete search history.

(56) References Cited

U.S. PATENT DOCUMENTS

| 6,192,380 | B1 * | 2/2001 | Light | G06F 17/243 |
| | | | | 707/999.009 |
| 8,185,820 | B1 * | 5/2012 | Good | 715/253 |
| 2007/0162841 | A1 * | 7/2007 | Bailey et al. | 715/505 |
| 2009/0013279 | A1 * | 1/2009 | Klems | G06F 17/243 |
| | | | | 715/780 |
| 2010/0192058 | A1 * | 7/2010 | Rountree | G06Q 30/02 |
| | | | | 715/246 |
| 2012/0117455 | A1 * | 5/2012 | Fogel | G06Q 10/0633 |
| | | | | 715/221 |

OTHER PUBLICATIONS

Phishing, http://web.archive.org/web/20100125212610/http://en.wikipedia.org/wiki/Phishing, Jan. 25, 2010, pp. 1-23.*
Australian caradvice.com, http://web.archive.org/web/20080409210751/http://www.caradvice.com.au/11793/build-and-price-your-fg-falcon-online/, Apr. 9, 2008, p. 2.*
Ajax, http://web.archive.org/web/20091201113857/http://en.wikipedia.org/wiki/Ajax_(programming), Dec. 1, 2009, p. 1.*

* cited by examiner

*Primary Examiner* — Jennifer To
*Assistant Examiner* — John Repsher, III
(74) *Attorney, Agent, or Firm* — ALG Intellectual Property, LLC (57) ABSTRACT

A computer-implemented method for interfacing with dynamic web forms may include (1) identifying a web page, (2) parsing the web page in order to identify an attribute of at least one interactive element that indicates that the interactive element may be used to create at least one input field on the web page, (3) in response to identifying the attribute, monitoring the interactive element in order to detect a user interaction with the interactive element, (4) in response to detecting the user interaction with the interactive element, identifying at least one new input field on the web page, and (5) performing an automated task on the new input field in response to the input field being newly identified. Various other methods, systems, and computer-readable media are also disclosed.

20 Claims, 6 Drawing Sheets

SYSTEMS AND METHODS FOR INTERFACING WITH DYNAMIC WEB FORMS

BACKGROUND

As the World Wide Web has matured, the number of websites hosting email, banking, e-commerce, and social networking services, as well as the number of users accessing these services, has increased. Users may be accustomed to providing these legitimate websites with confidential and/or personal information. Consequently, malicious websites posing as legitimate websites may pose a serious security threat. For example, malicious websites may be used to steal confidential information (e.g., user credentials or credit card numbers) as part of a phishing attack.

Traditional anti-phishing efforts may analyze web pages when they are loaded to assess risk threats posed by each web page. One important component of this analysis may include examining web forms on the web pages where users may enter their information. However, over time some web pages have become increasingly dynamic, changing their content without synchronous communication from the servers from which the web pages were loaded. Accordingly, traditional efforts that analyze a web page when the web page is loaded may miss critical information, including web forms that are dynamically created, displayed, and/or modified within the web page after the web page is loaded from a server. Therefore, the instant disclosure identifies a need for systems and methods for interfacing with dynamic web forms.

SUMMARY

As will be described in greater detail below, the instant disclosure generally relates to systems and methods for interfacing with dynamic web forms by analyzing web pages to detect elements of the web pages which may result in the creation and/or modification of web forms and then monitoring these elements for interactions. These systems and methods may then respond to interactions with these elements by automatically creating an updated view of the web forms on the web pages. In one example, a computer-implemented method for interfacing with dynamic web forms may include (1) identifying a web page, (2) parsing the web page in order to identify an attribute of at least one interactive element that indicates that the interactive element may be used to create at least one input field on the web page, (3) in response to identifying the attribute, monitoring the interactive element in order to detect a user interaction with the interactive element, (4) in response to detecting the user interaction with the interactive element, identifying at least one new input field on the web page, and (5) performing an automated task on the new input field in response to the input field being newly identified.

In some examples, the web page may include at least one script for modifying the web page without retrieving a new version of the web page from a server. In these examples, the interactive element may include an interactive element as represented in a model of the web page used within the scripting language of the script. In one example, identifying the web page may include identifying a web page configured to update asynchronously with respect to a server of origin of the web page. In this example, parsing the web page may entail parsing the web page in response to identifying that the web page is configured to update asynchronously.

In one embodiment, parsing the web page may include identifying a predetermined string that indicates that the interactive element may be used to create at least one input field on the web page. In some examples, the computer-implemented method may include monitoring the interactive element by modifying the interactive element to include an event listener configured to execute at least one predetermined instruction following at least one predetermined event.

In one example, identifying the new input field on the web page may entail identifying a new version of the web page modified asynchronously with respect to a server from which the web page was retrieved and then parsing the new version of the web page for the new input field. In this example, the computer-implemented method may also include waiting for a predetermined amount of time after detecting the user interaction with the interactive element before parsing the web page for the new input field in order to ensure that the web page has been updated with the new input field.

In some examples, performing the automated task may include automatically populating the new input field with data without direct user input to the new input field. Additionally or alternatively, performing the automated task may include providing an updated representation of the web page that includes a representation of the new input field to an anti-phishing engine.

In one example, the computer-implemented method may also include monitoring a web browser to determine that the web browser is loading the web page. In this example, the computer-implemented method may also include delaying rendering of the web page within the web browser until after determining, based on the attribute, that the interactive element may be used to create the input field on the web page and configuring the interactive element for monitoring to determine when the user interaction with the interactive element creates the new input field. In this example, the computer-implemented method may additionally include loading configuration data for performing the automated task on the new input field.

In one embodiment, a system for implementing the above-described method may include an identification module programmed to identify a web page and parse the web page in order to identify an attribute of at least one interactive element that indicates that the interactive element may be used to create at least one input field on the web page. The system may also include a monitoring module programmed to, in response to identifying the attribute, monitor the interactive element in order to detect a user interaction with the interactive element. The system may additionally include an update module programmed to, in response to detecting the user interaction with the interactive element, identify at least one new input field on the web page. The system may further include a task module programmed to perform an automated task on the new input field in response to the input field being newly identified. The system may also include at least one processor configured to execute the identification module, the monitoring module, the update module, and the task module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a web page, (2) parse the web page in order to identify an attribute of at least one interactive element that indicates that the interactive element may be used to create at least one input field on the web page, (3) in response to identifying the attribute, monitor the interactive element in order to detect a user interaction with the interactive element, (4) in response to detecting the user interaction with the interactive element, identify at least one new input field on the web page, and (5) perform an automated task on the new input field in response to the input field being newly identified.

As will be explained in greater detail below, by monitoring elements in dynamic web pages that may contribute to the creation and/or modification of web forms, the systems and methods described herein may facilitate a consistently correct view of web forms on dynamic web pages. In some examples, this may lead to improved functionality to automatically filling web forms and/or in anti-phishing engines.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
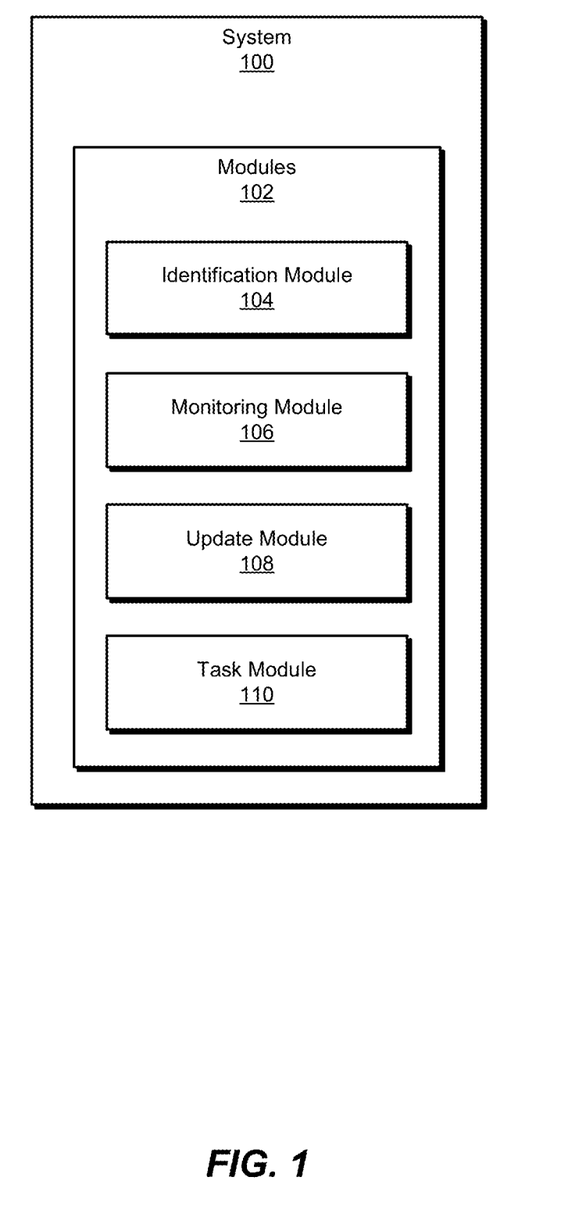
FIG. 1 is a block diagram of an exemplary system for interfacing with dynamic web forms.
Figure 2:
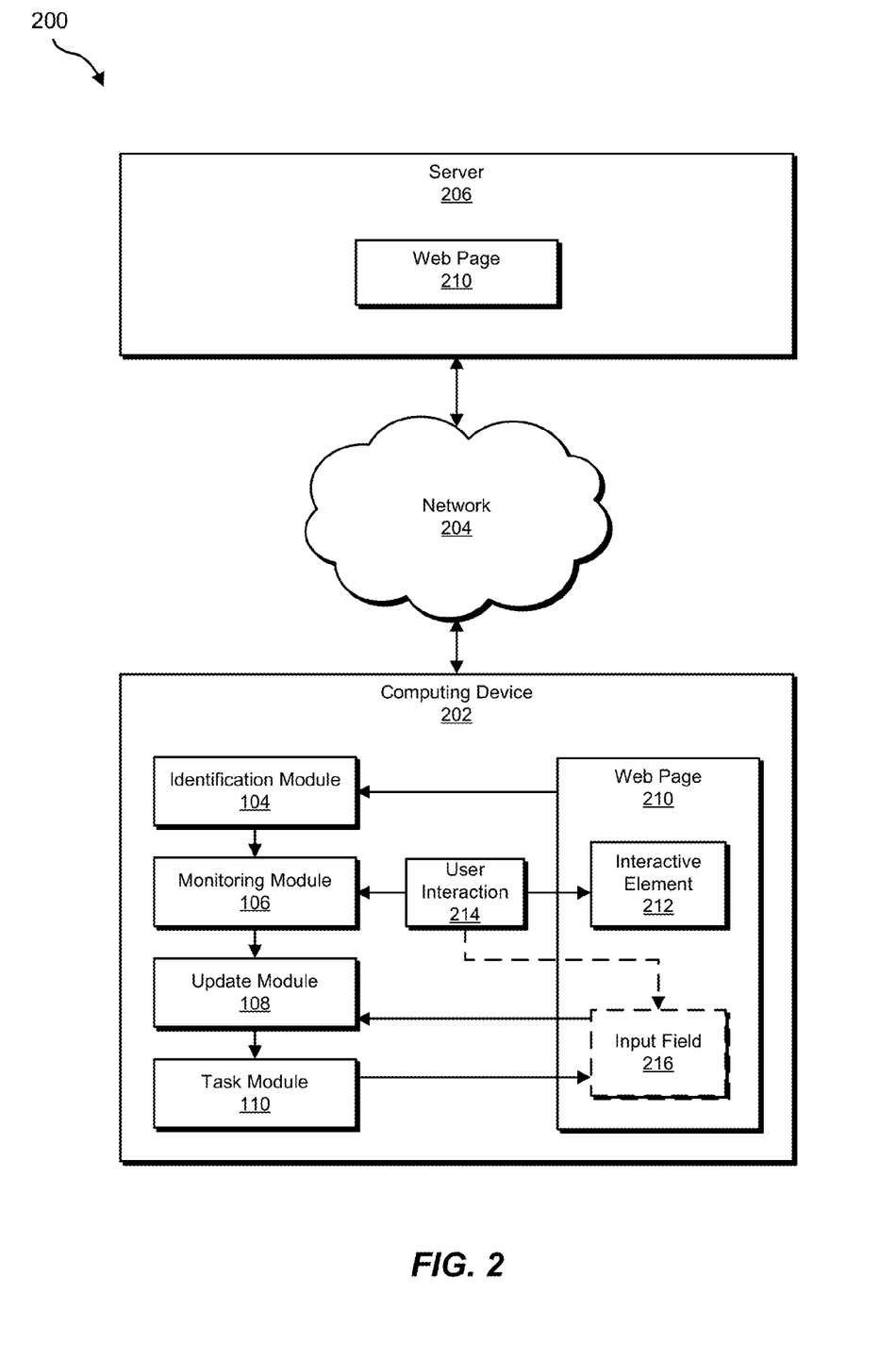
FIG. 2 is a block diagram of an exemplary system for interfacing with dynamic web forms.

The following will provide, with reference to FIGS. 1-2, detailed descriptions of exemplary systems for interfacing with dynamic web forms. Detailed descriptions of corresponding computer-implemented methods will also be provided in connection with FIG. 3. Detailed descriptions of an exemplary dynamic web page will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for interfacing with dynamic web forms. As illustrated in this figure, exemplary system 100 may include one or more modules 102 for performing one or more tasks. For example, and as will be explained in greater detail below, exemplary system 100 may include an identification module 104 programmed to identify a web page and to parse the web page in order to identify an attribute of at least one interactive element that indicates that the interactive element may be used to create at least one input field on the web page. Exemplary system 100 may also include a monitoring module 106 programmed to, in response to identifying the attribute, monitor the interactive element in order to detect a user interaction with the interactive element. Exemplary system 100 may additionally include an update module 108 programmed to, in response to detecting the user interaction with the interactive element, identify at least one new input field on the web page.

In addition, and as will be described in greater detail below, exemplary system 100 may include a task module 110 programmed to perform an automated task on the new input field in response to the input field being newly identified. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, identification modules 104, monitoring module 106, update module 108, and task module 110 from FIG. 1 may, when executed by at least one processor of computing device 202, facilitate computing device 202 in interfacing with dynamic web forms. For example, and as will be described in greater detail below, identification module 104 may be programmed to identify a web page 210 and parse web page 210 in order to identify an attribute of interactive element 212 that indicates that interactive element 212 may be used to create a new input field on web page 210 (e.g., an input field 216). Monitoring module 106 may be programmed to, in response to identifying the attribute, monitor interactive element 212 in order to detect a user interaction 214 with interactive element 212. Update module 108 may be programmed to, in response to detecting user interaction 214 with interactive element 212, identify input field 216 on the web page. Task module 110 may be programmed to perform an automated task on input field 216 in response to input field 216 being newly identified.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of fulfilling a request for a web page. Examples of server 206 include, without limitation, web servers and other Internet servers configured to provide web pages.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
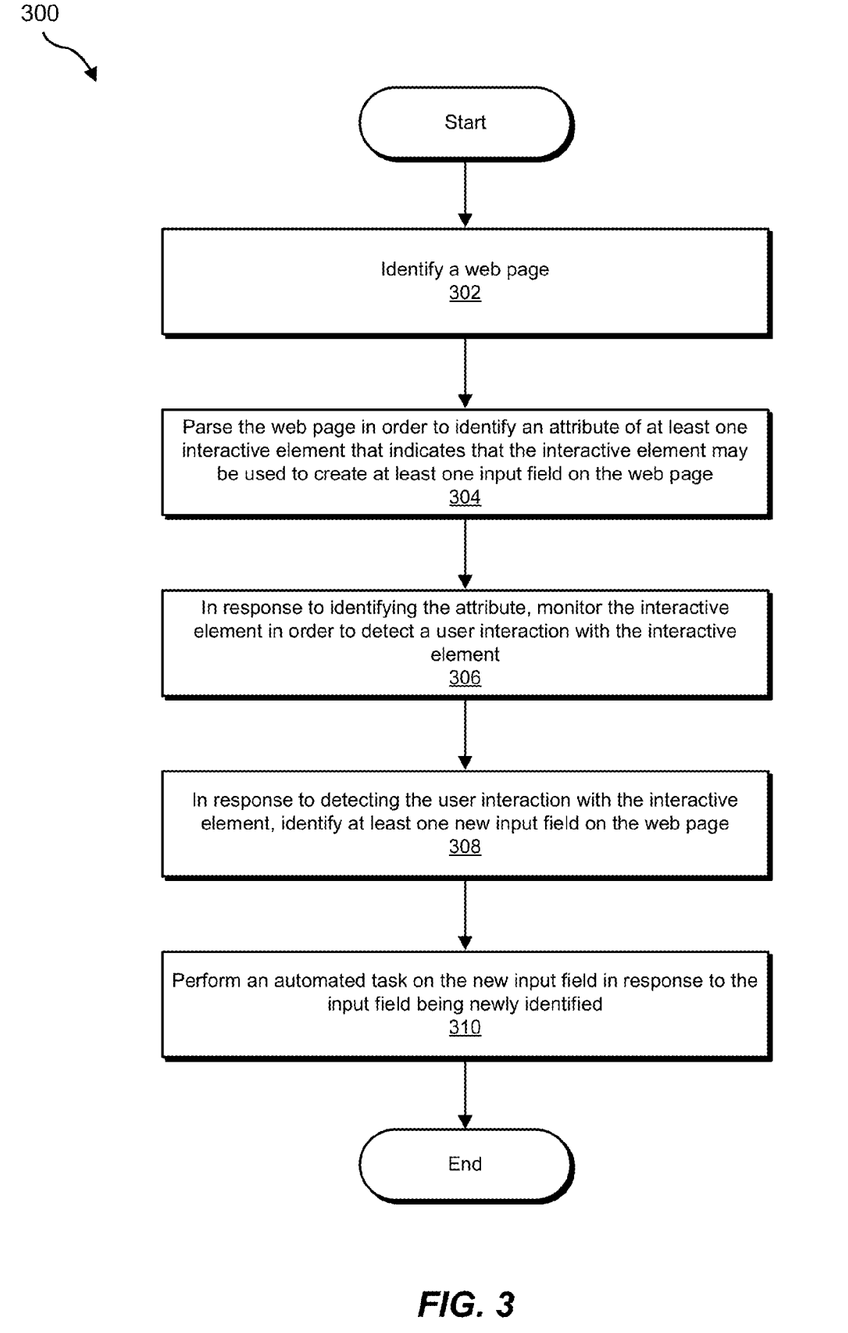
FIG. 3 is a flow diagram of an exemplary method for interfacing with dynamic web forms.

FIG. 3 is a flow diagram of an exemplary computer-implemented method 300 for interfacing with dynamic web forms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a web page. For example, at step 302 identification module 104 may, as part of computing device 202 in FIG. 2, identify web page 210.

As used herein, the phrase "web page" may refer to any Internet document and/or resource. Examples of web pages include, without limitations, documents formatted in Hypertext Markup Language ("HTML") and/or Extensible Hyper-Text Markup Language ("XHTML"). In some examples, a web page may include any Internet document and/or resource that can be rendered within a web browser.

In some examples, the web page may include at least one script for modifying the web page without retrieving a new version of the web page from a server. For example, the web page may include a JavaScript script. In this example, the JavaScript script may be designed within the AJAX paradigm for creating client-side interaction with the web page.

Identification module 104 may perform step 302 in any of a variety of ways. For example, identification module 104 may identify the web page by identifying an attempt to retrieve the web page from a server. In this example, identification module 104 may intercept and/or monitor traffic between a client retrieving the web page and the server. Additionally or alternatively, identification module 104 may identify the web page by identifying an attempt to load and/or render the web page in a web browser. As will be explained in greater detail below, in some examples identification module 104 may intercept an attempt to load and/or render the web page and delay the attempt until one or more of the systems described herein have performed one or more of the steps described herein.

In one example, identification module 104 may identify the web page by identifying a web page configured to update asynchronously with respect to a server of origin of the web page. For example, the web page may include functionality enabling the web page to change on the client side without requesting a new version of the page from the server. As will be explained in greater detail below, in this example, identification module 104 may determine that one or more of the steps described herein apply to the web page as a consequence of identifying the web page as a web page configured to update asynchronously.

Figure 4:
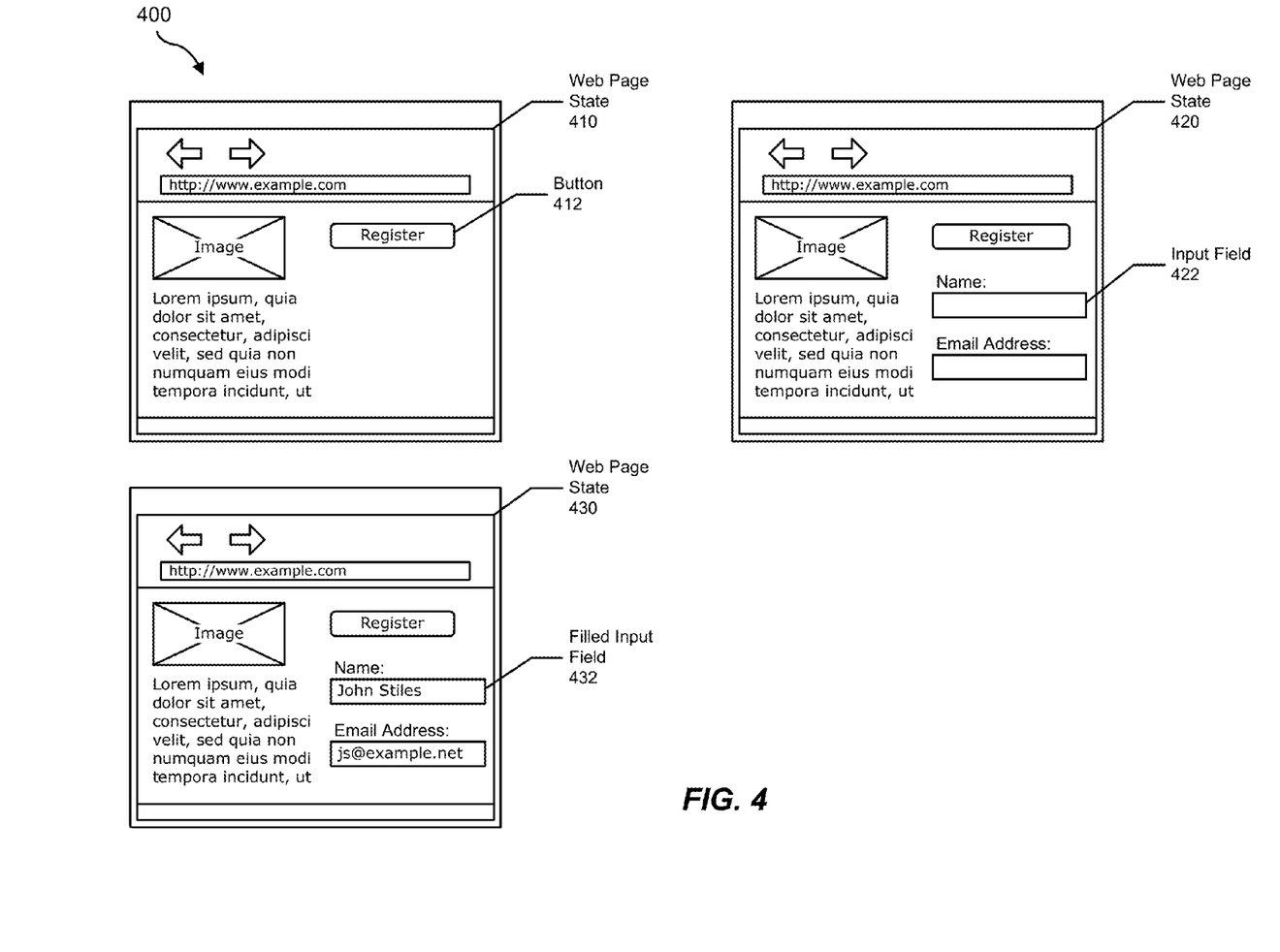
FIG. 4 is a diagram of an exemplary dynamic web page.

FIG. 4 is an illustration of an exemplary dynamic web page 400 in three states: a web page state 410, a web page state 420, and a web page state 430. Using FIG. 4 as an example of step 302, at step 302 identification module may identify web page 400 (e.g., in web page state 410).

Returning to FIG. 3, at step 304 one or more of the systems described herein may parse the web page in order to identify an attribute of at least one interactive element that indicates that the interactive element may be used to create at least one input field on the web page. For example, at step 304 identification module 104 may, as part of computing device 202 in FIG. 2, identify an attribute of interactive element 212 that indicates that interactive element 212 may be used to create an input field on web page 210 (e.g., input field 216).

As used herein, the phrase "input field" may refer to any element and/or component of a web page capable of receiving, storing, and/or relaying information from a client system and/or a user of the client system. Examples of input fields include, without limitation, text fields, combo boxes, checkboxes, radio buttons, file selectors, calendar date selectors, slider input elements, and/or sketchpads. In some examples the phrase "input field" may refer to an element of a web form.

As used herein, the phrase "interactive element" may refer to any element and/or feature of a web page that can cause a change in another element of the web page. In some examples, the phrase "interactive element" may refer to an element that can receive input (e.g., mouse input and/or keyboard input from a user). Examples of interactive elements may include, without limitation, hyperlinks, buttons, and images.

As mentioned earlier, in some examples the web page may include a script for modifying the web page without retrieving a new version of the web page from a server. In these examples, the interactive element may include an interactive element as represented in a model of the page used within the scripting language of the script. For example, the interactive element may include a Document Object Model ("DOM") element that is represented in a JavaScript script of the web page.

Identification module 104 may identify the attribute of the interactive element in any of a variety of ways. For example, identification module 104 may identify an identifier assigned to the interactive element. Additionally or alternatively, identification module 104 may identify the value of a field of the interactive element. In some examples, identification module 104 may identify data (e.g., text and/or another element) that is proximate to the interactive element in the web page document. Additionally or alternatively, identification module 104 may identify an element that is proximate to the interactive element in the rendered web page.

The attribute may include any of a variety of data and/or characteristics. In some examples, the attribute may include a string of text. For example, identification module 104 may parse the web page to identify a predetermined string that indicates that the interactive element may be used to create at least one input field on the web page. For example, identification module 104 may parse the web page to identify any of a set of strings which, in association with the interactive element, may indicate that the interactive element may be used to create an input field. For instance, identification module 104 may parse the web page for a button and/or hyperlink associated with the text "log in," "sign in," "sign up," "register," and/or "create an account." In such embodiments, identification module 104 may parse the web page for a button that displays one of the aforementioned strings. As another example, identification module 104 may parse the web page for an image with hovertext that includes one of the aforementioned strings. In some examples, identification module 104 may read from an external data file to identify the predetermined strings. For example, an external data file may enable the list of predetermined strings to be changed, updated, and/or localized to account for different languages.

In some additional examples, the attribute may include a regular expression. For example, identification module 104 may parse the web page for a regular expression associated with the interactive element that indicates that the interactive element may create and/or modify a web form.

Using FIG. 4 as an example, at step 304 identification module 104 may identify "Register" as a string displayed on a button 412 on web page 400. The string "Register" may indicate that button 412 may be used to create an input field.

Identification module 104 may parse the web page in any of a variety of contexts. For example, as mentioned earlier, the web page may be configured to update asynchronously with respect to a server of origin of the web page. In this example, identification module 104 may parse the web page in response to identifying that the web page is configured to update asynchronously.

Returning to FIG. 3, at step 306 one or more of the systems described herein may, in response to identifying the attribute, monitor the interactive element in order to detect a user interaction with the interactive element. For example, at step 306 monitoring module 106 may, as part of computing device 202 in FIG. 2, monitor interactive element 212 in order to detect a user interaction (e.g., user interaction 214) with interactive element 212.

Monitoring module 106 may perform step 306 in any of a variety of ways. For example, monitoring module 106 may monitor the interactive element by modifying the interactive element to include an event listener configured to execute at least one predetermined instruction following at least one predetermined event. For example, monitoring module 106 may modify the interactive element with an event listener configured to send monitoring module 106 a message when the interactive element receives a mouse click input. As an example, the interactive element may include a DOM element. In this example, monitoring module 106 may add the "onclick" attribute to the interactive element, specifying the execution of a JavaScript function that sends a message to monitoring module 106.

In another example, monitoring module 106 may monitor the interactive element by monitoring a user's interaction with the web page. For example, monitoring module 106 may operate as a plug-in within a web browser loaded with the web page.

Using FIG. 4 as an example, at step 306 monitoring module 106 may monitor button 412 in order to detect a user interaction with button 412 (e.g., a user pressing the button). After the user interaction with button 412, web page 400 may change from web page state 410 to web page state 420, and web page 400 may then include an input field 422.

Returning to FIG. 3, at step 308 one or more of the systems described herein may, in response to detecting the user interaction with the interactive element, identify at least one new input field on the web page. For example, at step 308 update module 108 may, as part of computing device 202 in FIG. 2, and in response to monitoring module 106 detecting user interaction 214, identify input field 216 on web page 210.

In some examples, the new input field may include an input field that had not existed in any previous form on the web page. Additionally or alternatively, the new input field may include a previously existing input field with one or more changes. For example, the new input field may include an input field that was previously greyed out (e.g., not accepting input) that changed to accept input. As another example, the new input field may include an input field that was previously invisible but became visible after (e.g., as a result of) the interaction with the interactive element. In an additional example, the new input field may include an input field that was relabeled. Generally, the new input field may include any input field that automated system that analyzes input fields (e.g., a form filler, an anti-phishing engine, etc.) may not correctly and/or fully analyze due to a change to the web page.

Update module 108 may identify the new input field on the web page in any suitable manner. For example, update module 108 may first identify a new version of the web page modified asynchronously with respect to a server from which the web page was retrieved. The new version of the web page may include the new input field where the previous version of the web page (e.g., before the user interaction with the interactive element) had not. Update module 108 may then parse the new version of the web page for the new input field.

In some examples, update module 108 may not immediately parse the new version of the web page for the new input field. For example, update module 108 may wait for a predetermined amount of time after detecting the user interaction with the interactive element before parsing the web page for the new input field in order to ensure that the web page has been updated with the new input field. For example, update module 108 may wait 80 milliseconds after the interaction with the interactive element in order to ensure that the process started by the interaction has time to complete so that the new input field will be included in the web page when update module 108 parses the web page again. In another example, update module 108 may monitor a process executed in response to the interaction to determine when the process has completed and wait until the process has completed before parsing the new version of the web page.

The new input field may be designed to receive any of a variety of types of information. For example, the new input field may be designed to receive sensitive information, such as financial account numbers or social security numbers. In another example, the new input field may be designed to receive commonly requested information (e.g., information frequently requested by e-commerce web sites), such as a name, a telephone number, or an address. As another example, the new input field may be designed to receive authentication information, such as a username or a password. In some examples, update module 108 may parse the new version of the web page specifically for input fields designated to receive one or more of these categories of information.

Using FIG. 4 as an example, after a user presses button 412 of web page 400 in web page state 410, web page 400 may transition to web page state 420 by adding new input fields (including input field 422). Update module 108 may then parse web page 400 in web page state 420 and identify input field 422.

Returning to FIG. 3, at step 310 one or more of the systems described herein may perform an automated task on the new input field in response to the input field being newly identified. For example, at step 310 task module 110 may, as part of computing device 202 in FIG. 2, perform an automated task on input field 216 in response to input field 216 being newly identified on web page 210.

Task module 110 may perform any of a variety of tasks on the new input field. In one example, task module 110 may automatically populate the new input field with data without direct user input to the new input field. For example, task module 110 may identify the new input field within the context of the web page and automatically fill in data with which the new input field had been filled on a prior occasion. In another example, task module 110 may parse text related to the new input field (e.g., a name of the new input field, text displayed on or proximate to the new input field, etc.) and determine what input is expected for the new input field. In this example, task module 110 may automatically populate the new input field with the expected input. Additionally or alternatively, task module 110 may create a combo box of guesses and/or potential selections for input to the new input field from which a user may choose. In some examples, task module 110 may simply present an web form auto-form-filler program with the new version of the web page (e.g., based on the existence of the new input field) and allow the auto-form-filler program to perform its ordinary functions as if the new version of the web page had been the web page as originally loaded.

In another example, task module 110 may provide an updated representation of the web page that includes a representation of the new input field to an anti-phishing engine. For example, task module 110 may provide the new version of the web page as input to the anti-phishing engine. The anti-phishing engine may then analyze the web page in a state that includes the new input field. Additionally or alternatively, task module 110 may perform anti-phishing procedures based on the new input field. For example, if the new input field prompts the user to enter sensitive information such as bank account information, task module 110 may check the web page against a list of approved web sites to determine whether the web page is engaged in phishing. Additionally or alternatively, task module 110 may analyze the contents and/or behavior of the new version of the web page to determine whether the web page is engaged in phishing. Generally, task module 110 may use any appropriate anti-phishing analyses and/or techniques incorporating knowledge of the new input field.

Using FIG. 4 as an example, task module 110 may automatically fill input field 422, resulting in a filled input field 432 in a web page state 430. In this example, task module 110 may automatically fill a newly created "name" field with the user's name ("John Stiles") and a newly created "email address" field with the user's email address ("js@example.net"). After step 310, method 300 may terminate.

In some examples, identification module 104 may identify the web page by monitoring a web browser to determine that the web browser is loading the web page. In these examples, identification module 104 may delay rendering of the web page within the web browser until after determining, based on the attribute, that the interactive element may be used to create the input field on the web page, and after monitoring module 106 configures the interactive element for monitoring to determine when the user interaction with the interactive element creates the new input field. In this manner, identification module 104 may ensure that the new input field isn't created before the interactive element is monitored. This may ensure that update module 108 will parse the web page again after the new input field is created. In some examples, task module 110 may also load configuration data for performing the automated task on the new input field. For example, task module 110 may load configuration data specifying data to be used to automatically populate the new input field.

As explained above, by monitoring elements in dynamic web pages that may contribute to the creation and/or modification of web forms, the systems and methods described herein may facilitate a consistently correct view of web forms on dynamic web pages. In some examples, this may lead to improvements in automatically filling web forms and/or in anti-phishing measures.

Figure 5:
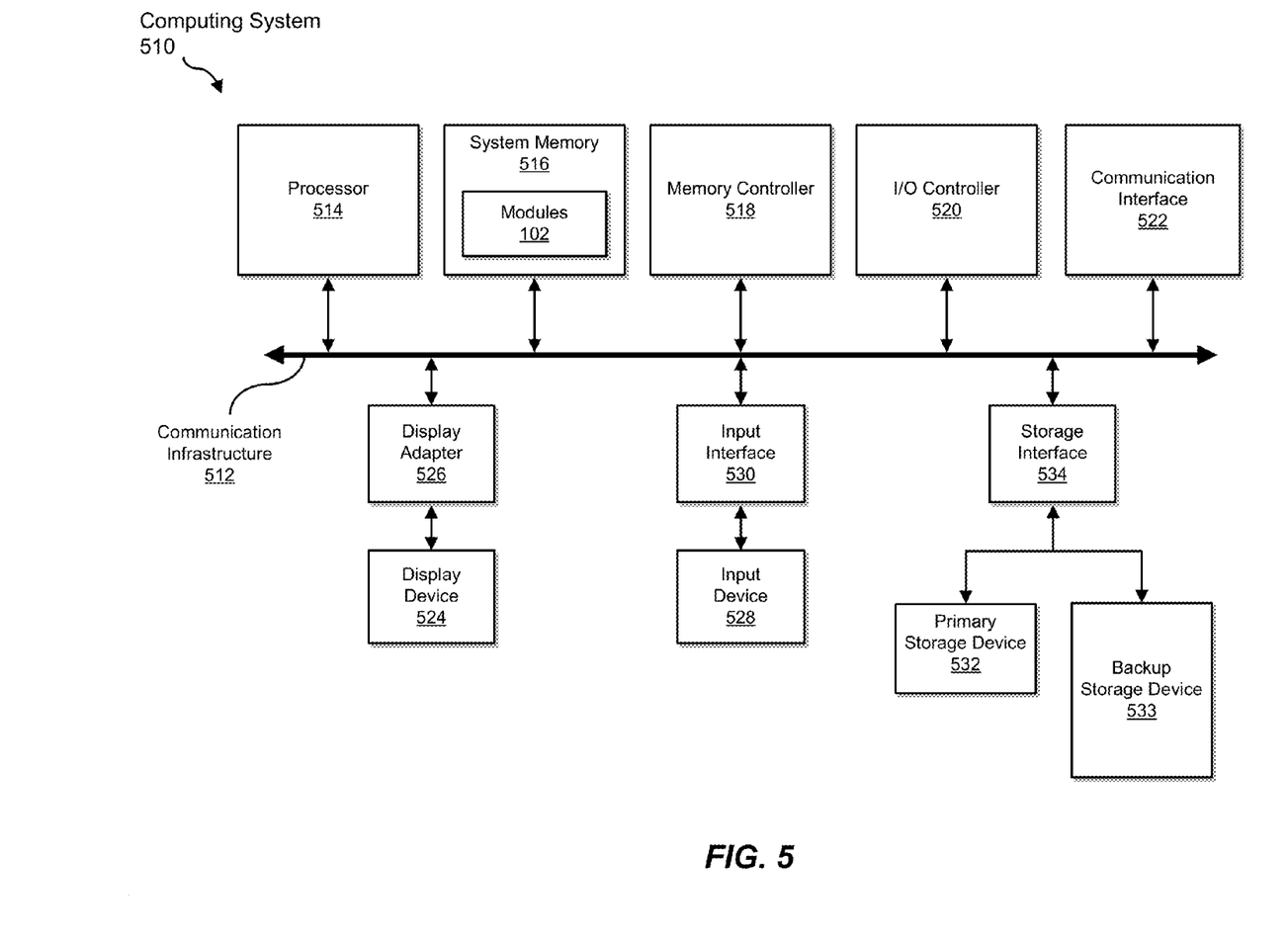
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, parsing, creating, monitoring, detecting, modifying, waiting, populating, providing, determining, configuring, and/or loading steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
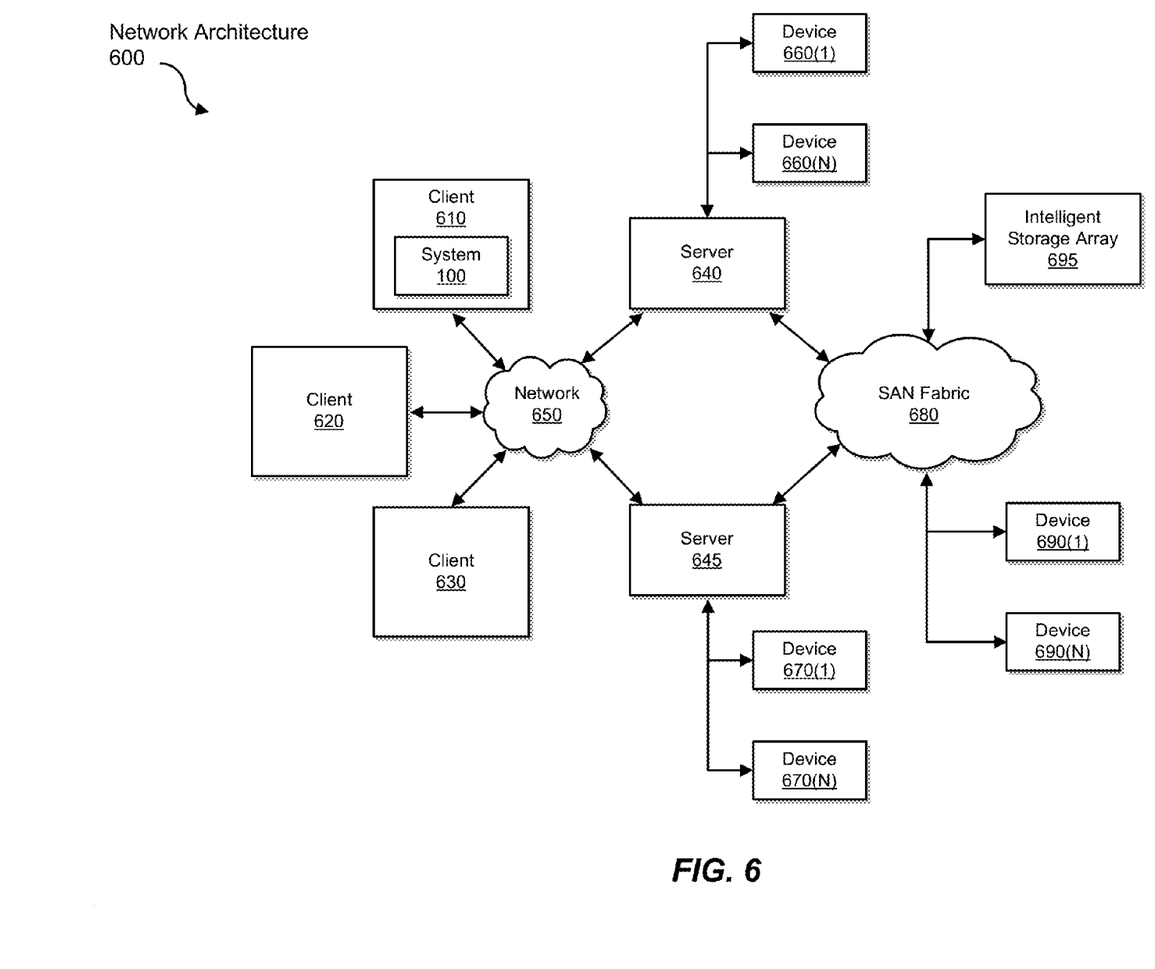
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, parsing, creating, monitoring, detecting, modifying, waiting, populating, providing, determining, configuring, and/or loading steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for interfacing with dynamic web forms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for interfacing with dynamic web forms.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for interfacing with dynamic web forms, at least a portion of the method being performed by a computing device comprising at least one processor, the method comprising:
    identifying, by a subsystem that interfaces with web pages, a web page that:
        is rendered by a web browser engine that is separate from the subsystem;
        includes at least one script for the web browser engine to modify the web page asynchronously with respect to a server of origin of the web page, wherein modifying the web page asynchronously with respect to the server of origin comprises modifying the web page without retrieving a new version of the web page from the server of origin;
    in response to determining that the web browser engine modifies the web page asynchronously with respect to the server of origin, parsing, by the subsystem, the web page in order to identify an attribute of at least one interactive element that indicates that the interactive element may be used to create at least one input field on the web page by the web browser engine;
    in response to identifying the attribute, monitoring, by the subsystem, the interactive element in order to detect a user interaction with the interactive element, wherein the user interaction causes a new input field to be created on the web page by the web browser engine;
    in response to detecting the user interaction with the interactive element, identifying, by the subsystem, the new input field on the web page;
    performing, by the subsystem, an automated task on the new input field in response to the input field being newly identified.

2. The computer-implemented method of claim 1, wherein performing the automated task on the new input field comprises the subsystem automatically populating the new input field with data without direct user input to the new input field.

3. The computer-implemented method of claim 1, wherein performing the automated task on the new input field comprises the subsystem providing an updated representation of the web page that comprises a representation of the new input field to an anti-phishing engine.

4. The computer-implemented method of claim 1, wherein monitoring the interactive element comprises the subsystem modifying the interactive element to include an event listener configured to execute at least one predetermined instruction following at least one predetermined event.

5. The computer-implemented method of claim 1, wherein parsing the web page to identify the attribute comprises the subsystem parsing the web page to identify a predetermined string that indicates that the interactive element may be used by the web browser engine to create at least one input field on the web page.

6. The computer-implemented method of claim 1, wherein:
    the interactive element comprises an interactive element as represented in a model of the page used within the scripting language of the script.

7. The computer-implemented method of claim 1, wherein identifying the new input field on the web page comprises:
    the subsystem identifying a new version of the web page modified asynchronously with respect to the server of origin of the web page;
    the subsystem parsing the new version of the web page for the new input field.

8. The computer-implemented method of claim 7, further comprising the subsystem waiting for a predetermined amount of time after detecting the user interaction with the interactive element before parsing the web page for the new input field in order to ensure that the web page has been updated with the new input field.

9. The computer-implemented method of claim 7, further comprising:
    monitoring, by the subsystem, a process executed by the web page in response to the user interaction with the interactive element;
    parsing, by the subsystem, the web page for the new input field after determining that the process has completed.

10. The computer-implemented method of claim 1, further comprising:
    the subsystem monitoring the web browser engine to determine that the web browser engine is loading the web page;
    the subsystem delaying rendering of the web page within the web browser engine until after:
        determining, based on the attribute, that the interactive element may be used to create the input field on the web page;
        configuring the interactive element for monitoring to determine when the user interaction with the interactive element creates the new input field;
    the subsystem loading configuration data for performing the automated task on the new input field.

11. A system for interfacing with dynamic web forms, the system comprising:
    an identification module, within a subsystem that interfaces with web pages, programmed to:
        identify a web page that:
            is rendered by a web browser engine that is separate from the subsystem;
            includes at least one script for the web browser engine to modify the web page asynchronously with respect to a server of origin of the web page, wherein modifying the web page asynchronously with respect to the server of origin comprises modifying the web page without retrieving a new version of the web page from the server of origin;

in response to determining that the web browser engine modifies the web page asynchronously with respect to the server of origin, parse the web page in order to identify an attribute of at least one interactive element that indicates that the interactive element may be used to create at least one input field on the web page by the web browser engine;

a monitoring module, within the subsystem, programmed to, in response to identifying the attribute, monitor the interactive element in order to detect a user interaction with the interactive element, wherein the user interaction causes a new input field to be created on the web page by the web browser engine;

an update module, within the subsystem, programmed to, in response to detecting the user interaction with the interactive element, identify the new input field on the web page;

a task module, within the subsystem, programmed to perform an automated task on the new input field in response to the input field being newly identified;

at least one processor configured to execute the identification module, the monitoring module, the update module, and the task module.

12. The system of claim 11, wherein the task module within the subsystem is programmed to perform the automated task on the new input field by automatically populating the new input field with data without direct user input to the new input field.

13. The system of claim 11, wherein the task module within the subsystem is programmed to perform the automated task on the new input field by providing an updated representation of the web page that comprises a representation of the new input field to an anti-phishing engine.

14. The system of claim 11, wherein the monitoring module within the subsystem is programmed to monitor the interactive element by modifying the interactive element to include an event listener configured to execute at least one predetermined instruction following at least one predetermined event.

15. The system of claim 11, wherein the identification module within the subsystem is programmed to parse the web page to identify the attribute by parsing the web page to identify a predetermined string that indicates that the interactive element may be used by the web browser engine to create at least one input field on the web page.

16. The system of claim 11, wherein:
the interactive element comprises an interactive element as represented in a model of the page used within the scripting language of the script.

17. The system of claim 11, wherein the update module within the subsystem is programmed to identify the new input field on the web page by:
identifying a new version of the web page modified asynchronously with respect to the server of origin of the web page;
parsing the new version of the web page for the new input field.

18. The system of claim 17, wherein the update module within the subsystem is further programmed to wait for a predetermined amount of time after detecting the user interaction with the interactive element before parsing the web page for the new input field in order to ensure that the web page has been updated with the new input field.

19. The system of claim 17, wherein the update module within the subsystem is further programmed to:
monitor a process executed by the web page in response to the user interaction with the interactive element;
parse the web page for the new input field after determining that the process has completed.

20. A non-transitory computer-readable-storage medium comprising one or more computer-executable instructions that, when executed by at least one processor of a computing device, cause the computing device to:
identify, by a subsystem that interfaces with web pages, a web page that:
is rendered by a web browser engine that is separate from the subsystem;
includes at least one script for the web browser engine to modify the web page asynchronously with respect to a server of origin of the web page, wherein modifying the web page asynchronously with respect to the server of origin comprises modifying the web page without retrieving a new version of the web page from the server of origin;
in response to determining that the web browser engine modifies the web page asynchronously with respect to the server of origin, parse, by the subsystem, the web page in order to identify an attribute of at least one interactive element that indicates that the interactive element may be used to create at least one input field on the web page by the web browser engine;
in response to identifying the attribute, monitor, by the subsystem, the interactive element in order to detect a user interaction with the interactive element, wherein the user interaction causes a new input field to be created on the web page by the web browser engine;
in response to detecting the user interaction with the interactive element, identify, by the subsystem, the new input field on the web page;
perform, by the subsystem, an automated task on the new input field in response to the input field being newly identified.

* * * * *